United States Patent [19]

Sakuragi

[11] Patent Number: 5,177,338
[45] Date of Patent: Jan. 5, 1993

[54] CATHODE STRUCTURE OF PLASMA-ARC TORCH

[75] Inventor: Shunichi Sakuragi, Kanagawa, Japan

[73] Assignee: Kabushiki Kaishia Komatsu Seisakusho, Tokyo, Japan

[21] Appl. No.: 803,668

[22] PCT Filed: Jul. 30, 1987

[86] PCT No.: PCT/JP87/00570
§ 371 Date: Mar. 29, 1990
§ 102(e) Date: Mar. 29, 1990

Related U.S. Application Data

[63] Continuation of Ser. No. 460,062, Mar. 29, 1990, abandoned.

[30] Foreign Application Priority Data

Apr. 15, 1986 [JP] Japan .................. 61-55313

[51] Int. Cl.⁵ .............................. B23K 9/00
[52] U.S. Cl. ........................ 219/121.52; 219/119; 219/121; 219/.49; 219/121.48; 219/123
[58] Field of Search .............. 219/118, 119, 121.52, 219/121.36, 121.48, 75, 121.49, 123

[56] References Cited

U.S. PATENT DOCUMENTS 3,610,796 10/1971 DeCorso et al. .................. 313/156

FOREIGN PATENT DOCUMENTS 54-67539 5/1979 Japan .
55-500023 1/1980 Japan .
55-33791 3/1980 Japan .
62-41476 3/1987 Japan .
62-116400 7/1987 Japan .
2006585A 5/1979 United Kingdom .

Primary Examiner—Mark H. Paschall
Attorney, Agent, or Firm—Armstrong, Westerman, Hattori, McLeland & Naughton

[57] ABSTRACT

A cathode structure of a transition type plasma arc torch, in which a cooling effect is enhanced, and also an amount of consumption of cathode material is reduced by continuously moving a discharge point in the bottom end surface of the cathode during generating of a plasma arc. The cathode structure includes one cathode (21) of small-diameter circular column shape having a minute concave surface portion formed on its bottom end surface symmetrically with respect to its axis, a holder (20) for holding the cathode having such structure that easy and highly effective cooling is possible, and a generating device of lines of magnetic force (23) disposed coaxially with the aforementioned cathode (21) so that a line of magnetic force vector B such that $E \times B \neq 0$ may be fulfilled with respect to a line of electric force vector E generated on the bottom end surface of the cathode, may be generated symmetrically with respect to the axis of the cathode.

4 Claims, 3 Drawing Sheets

CATHODE STRUCTURE OF PLASMA-ARC TORCH

This application is a continuation of application Ser. No. 460,062 filed Mar. 29, 1991 now abandoned.

TECHNICAL FIELD OF THE INVENTION

The present invention relates to a cathode structure of a plasma-arc torch that is available in cutting and welding of metal, and more particularly to a cathode structure of a transition type plasma-arch torch, wherein in order to remarkably reduce a consumed amount of cathode material, a cooling effect is enhanced, and also within a bottom surface of a cathode movement of a discharge point is made possible.

TECHNICAL BACKGROUND OF THE INVENTION

As a cathode structure of a plasma-arc torch in the prior art, a rod-shaped cathode structure and a buried type cathode structure are known as shown, for example, in "PRAZUMA SETSUDAN NO KISO TO JISSAI (Fundamental and Practice of Plasma-arch Cutting)" (in Japanese) edited by NIHON YOSETSU KAI (Society of Welding in Japan) (published Dec. 1, 1983 by KOSAIDO SANPOH SHUPPAN, page 48).

The rod-shaped cathode is a cathode mainly making use of inert gas such as argon, nitrogen, hydrogen, etc. as a working gas, and it is employed in a torch having a relatively small capacity, whereas the buried type cathode is a cathode wherein kafnium, zirconium or the like is buried in a tip end portion of a water-cooled copper pipe, and it mainly makes use of an oxidizing working gas such as oxygen, air, etc. and is employed in a torch having a relatively large capacity.

In addition, with regard to a cathode structure of non-transition type plasma-arc torch, in the case of large-capacity torches, cathodes having various shapes and structures have been devised. For instance, besides the above-mentioned rod-shaped or buried type cathodes, cathodes having a ring-shaped or hollow type (hallow cathode) structure have been used.

In common to the transition type and non-transition type plasma-arc torches, one big problem is abrupt consumption of a cathode and a nozzle accompanying the generation of plasma arcs. Especially in the case where oxidizing gases such as air, oxygen, etc. are used as a working gas, their life would become extremely short, and as a cathode, the life is so short that it becomes necessary to be replaced at an interval of about 0.5~3 hours.

Heretofore, because of the necessity of frequent cathode replacement works due to such a short period of life of the cathode, for instance, version to numerical control (NC) of a plasma-arc cutting machine and a plasma-arc welding machine as well as popularization of these machines are remarkably lagging.

Now, it has been well known that among the heretofore employed cathode structures and working gas feed systems in the transition type plasma-arc torches, there are an axial flow type and a swirl flow type. And in these plasma-arc torches of either axial flow type or swirl flow type in the prior art, a discharge point exists always at the center of the cathode, and as the time when a plasma arc is generated elapses, consumption of the cathode proceeds remarkably from its central portion.

As one method for resolving the problem of abrupt cathode consumption, it was devised by the inventor of this application to continuously move the discharge point on the cathode surface to a new position during generation of a plasma arc. The device is disclosed in Japanese Utility Model Application No. 60-130799 filed on Aug. 29, 1985. The cathode structure of the transition type plasma-arc torch based on this device is the structure shown in FIG. 1 of the accompanying drawings.

In FIG. 1, reference numeral 10 designates a cathode holder, and to the bottom end portion of this cathode holder 10 is mounted a cathode 11. The cathode 11 is provided with a hemispherical concave surface 12 on its bottom surface. In addition, the cathode holder 10 is provided with a generating device of lines of magnetic force 13 such as a coil, a permanent magnet or the like, and this generating device of lines of magnetic force 13 is disposed above the cathode 11 coaxially therewith. In the case where the generating device of lines of magnetic force 13 is a coil, a D.C. coil is used. Reference numeral 14 designates a nozzle for swirling a working gas, numeral 15 designates lines of magnetic force, numeral 16 designates lines of electric force, numeral 17 designates a discharge point, numeral 18 designates a plasma arc, and numeral 19 designates a nozzle.

Now description will be made on an operation of the plasma-arc torch shown in FIG. 1.

When the generating device of lines of magnetic force 13 operates, lines of magnetic force 15 as shown by dash lines are formed. In addition, since lines of the electric force 16 are formed in the perpendicular direction with respect to the bottom surface of the cathode 11, a vector product ($E \times B$) of the both would take an effective value not equal to zero, this is, $E \times B \neq 0$ almost over the entire region of the cathode bottom surface except for the center axis (the axis of symmetry) on which the respective directions of the line of electric force vector E and the line of magnetic force vector B coincide with each other. It is expected that in the proximity of the discharge point 17 in the figure, the product value takes the maximum value.

Accordingly, a Lorentz force serving as a force for driving the discharge point 17

$$F = j \times B = \sigma E \times B$$

would similarly take the maximum value. It is to be noted that $\sigma$ represents a conductivity, and j represents a current density of a current flowing through the plasma. And since the array of the lines of magnetic force (the magnetic field arrangement) is symmetric with respect to an axis, a revolving motion of the discharge point 17 as shown in FIG. 1 is induced.

In the above-described cathode structure in a plasma-arc torch shown in FIG. 1, since the volume of cathode material becomes large, a cooling effect by coolant medium was poor. Especially, in the case where oxidizing gas such as oxygen, air or the like is used as a working gas, often hafnium, zirconium or the like is used as cathode material. As hafnium and zirconium are metals having a very small thermal conductivity, the known cathode structure had a shortcoming that when these metals are used as cathode material, if its volume is made large, the temperature in the proximity of the discharge point would rise, and an amount of local consumption of a cathode would become large.

DISCLOSURE OF THE INVENTION

The present invention has been worked out in view of the aforementioned circumstances, and one object of the invention is to provide a cathode structure of a transition type plasma-arc torch improved in that a cooling effect by coolant medium such as coolant water can be enhanced.

Another object of the present invention is to provide a cathode structure of a transition type plasma-arc torch, wherein during generation of a plasma arc, a discharge point is made continuously movable on the bottom surface of the cathode material.

Thus, with the cathode structure according to the present invention, a consumed amount of cathode material can be remarkably reduced.

In order to achieve the above-mentioned various objects, according to the present invention, there is provided a cathode structure of a transition type plasma-arc torch comprising a cathode of circular column shape having a small diameter, a holder having a structure that is easy to be cooled for holding the cathode at the central portion of the bottom, and a generating device of lines of magnetic force disposed coaxially with the aforementioned cathode so that a line of magnetic force vector B such that $E \times B \neq 0$ may be fulfilled with respect to a line of electric force vector E generated on the bottom surface of the aforementioned cathode, may be generated symmetrically with respect to the axis of the cathode.

DESCRIPTION OF THE BEST MODE OF THE INVENTION

The cathode structure of a transition type plasma-arc torch according to the present invention will be explained in greater detail in the following, in connection to the respective different embodiments shown in FIGS. 2 through 5.

Figure 2:
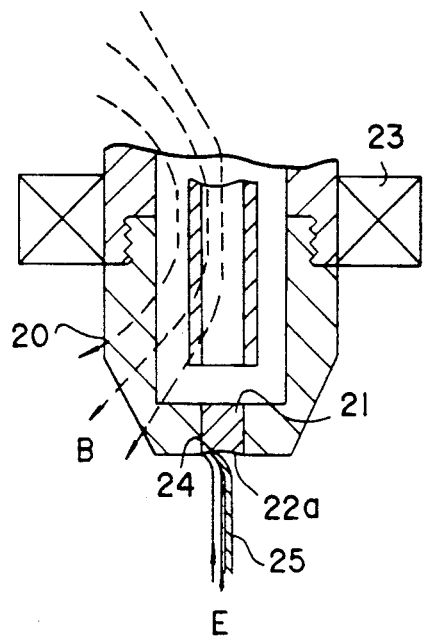
FIGS. 2 through 5 are schematic cross-section views of an essential part respectively showing different embodiments relating to a cathode structure of a transition type plasma torch according to the present invention.
Figure 3:
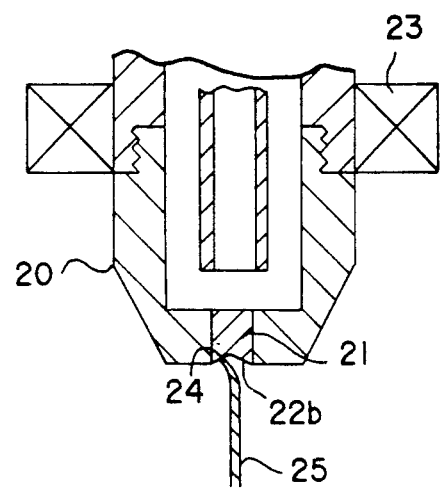

In each one of FIGS. 2 through 5, reference numeral 20 designates a holder composed of a water-cooled type of copper rod, and it is adapted to be easily and effectively cooled by coolant medium such as coolant water. Reference numeral 21 designates a cathode buried in the central bottom end portion of the holder 20. This cathode 21 is formed in a circular column shape having a small diameter, and on its tip end surface is provided a minute axially symmetric hemispherical concave surface 22a as shown in FIG. 2, or a minute axially symmetric circular cone-shaped concave surface 22b as shown in FIG. 3. The holder 20 for holding the cathode 21 is provided with a generating device of lines of magnetic force 23 such as a coil, a permanent magnet or the like, and this generating device of lines of magnetic force 23 is disposed above the cathode 21 and coaxially therewith. In the case where this generating device of lines of magnetic force 23 is a coil, a D.C. coil is used. It is to be noted that the above-mentioned coil 23 could be replaced by a permanent magnet.

Figure 1:
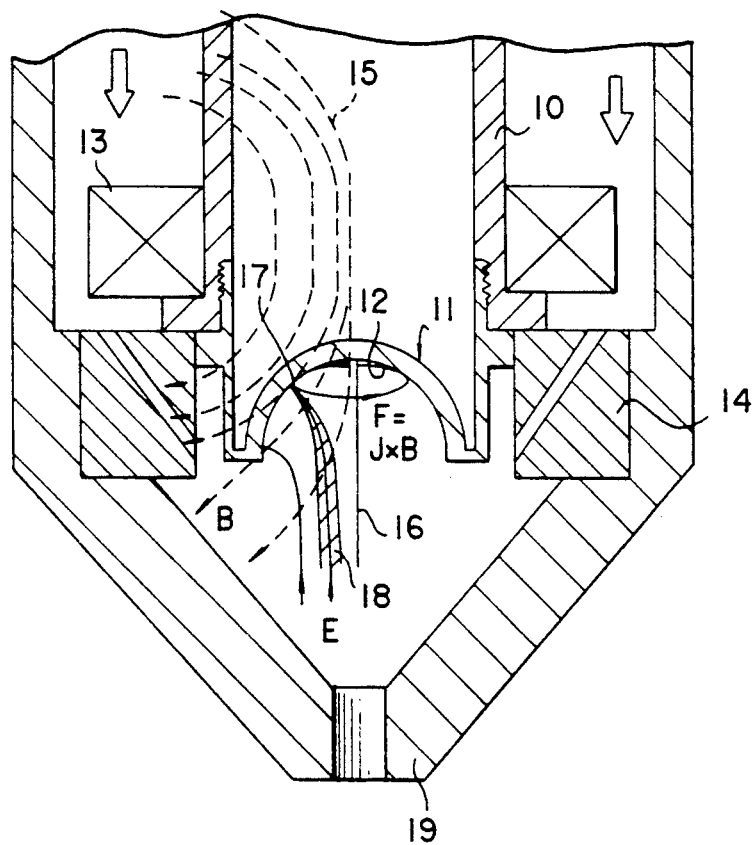
FIG. 1 is a schematic longitudinal cross-section view of an essential part showing a cathode structure of a transition type plasma-arc torch in the prior art.

It is just as explained already in connection to FIG. 1 that a Lorentz force ($F = \sigma E \times B$) is generated on the bottom end surface of the cathode 21 also in the case of the either embodiment shown in FIG. 2 or in FIG. 3, in the above-described construction. It is to be noted that in the above equation, F represents a Lorentz force, E represents a line of electric force vector, B represents a line of magnetic force vector, and $\sigma$ represents a conductivity of plasma.

And similarly to the cathode structure in the prior art in FIG. 1, in the respective embodiments of the cathode structure according to the present invention shown in FIGS. 2 and 3 also, since the array of magnetic field and the shape of cathode are both formed axially symmetrically, during generation of an plasma arc 25, for a discharge point 24 of the plasma arc 25 on the cathode bottom end surface 22a or 22b a revolving motion is induced, and the discharge point 24 is continuously moved on the cathode bottom end surface.

Figure 4:
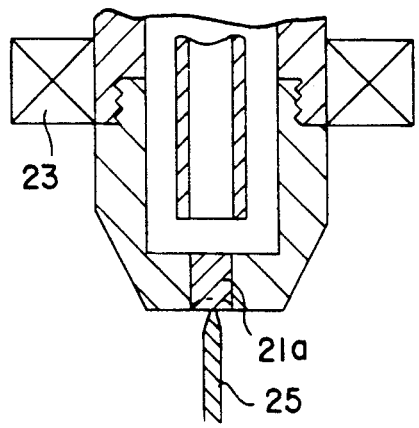
Figure 5:
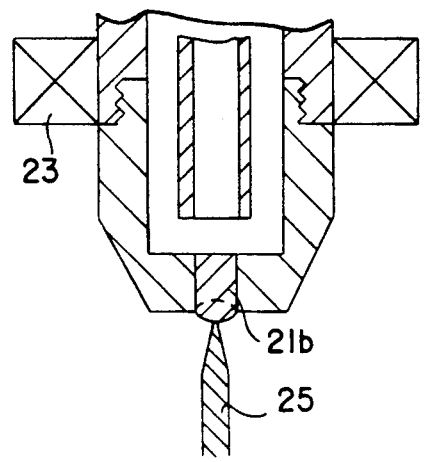

FIGS. 4 and 5 show embodiments of cathodes having further different shapes according to the present invention, the tip end shape of a cathode 21a shown in FIG. 4 is plain, and the tip end shape of a cathode 21b shown in FIG. 5 is an axially symmetric hemispherical convex shape. Among these both embodiments, in the case of the former embodiment a Lorentz force is very weak, and in the case of the latter embodiment a Lorentz force is almost not induced. However, even the cathodes 21a and 21b of these respective embodiments would be also consumed in proportion to the progress of use, and would become concave as shown by chain lines in FIGS. 4 and 5, and after they have become these states, effects and advantages similar to the respective embodiments shown n FIGS. 2 and 3, respectively, would be realized.

EXAMPLE OF EXPERIMENT

Figure 6:
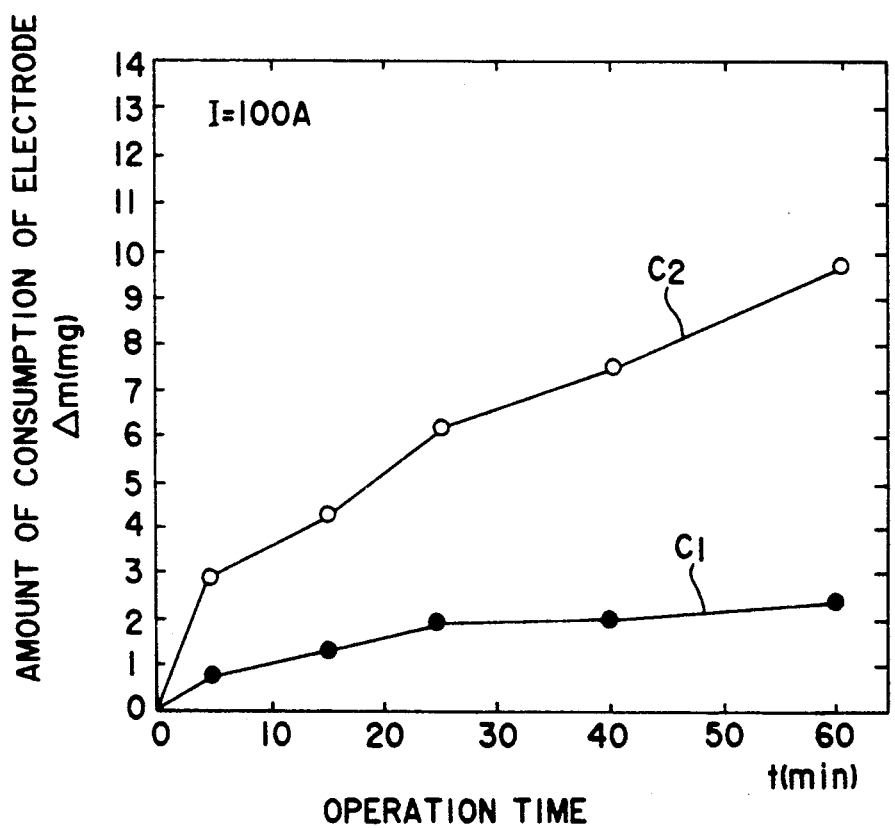
FIG. 6 is a graph showing an amount of consumption of a cathode with respect to an operation time when experiments were conducted by making use of the cathode structure of a transition type plasma-arc torch according to the present invention shown in FIG. 2.

FIG. 6 shows one example of experiment conducted for the purpose of confirming the effect and advantage of the cathode structure according to the present invention, the ordinate shows an amount mg of consumption of a cathode, and the abscissa shows an operation time t (min). The cathode used in this embodiment has the shape of the embodiment shown in FIG. 2, and the material is hafnium. For the generating device of lines of magnetic force, a D.C. coil is employed and its output is such that a magnetic flux density on the bottom end surface of the cathode amounts to about 70 gauses. As a working gas, oxygen is used, a flow rate thereof is 40 l/min, and an opening diameter of a plasma arc nozzle 19 is 2.3 mm. Also, an operation current was 100 A.

In the figure, $C_1$ represents the case where a magnetic field was applied, and $C_2$ represents the case where a magnetic field was not applied.

It is to be noted that even in the case where the cooling system for the cathode was changed to an air-cooling system, a sufficient effect desired according to the present invention was confirmed.

I claim:

1. A cathode structure of a transition type plasma-arc torch, comprising:
    a cathode having a solid cylindrical body, said cylindrical body having a relatively small diameter and an axially symmetric, minute concave surface at a bottom end surface thereof;

a holder means adapted to be relatively easily cooled having an end portion having a central opening, for receiving and holding said cathode within said central opening of said end portion of said holder means; and an electric field generating means for generating an electric field which is substantially parallel to and substantially symmetrical with respect to the cylindrical axis of said cathode;

a magnetic field generating means disposed coaxially with said cathode, for generating a magnetic field about said cathode such that the condition $E \times B \neq 0$, wherein B represents the magnetic field vector and E represents the electric field vector, is fulfilled with respect to the electric force vector E generated at the bottom end surface of said cathode.

2. A cathode structure of a transition type plasma-arc torch as claimed in claim 1, wherein said holder has a water-cooled type copper rod structure.

3. A cathode structure of a transition type plasma-arc torch as claimed in claim 1, wherein said axially symmetric, minute concave surface is hemispherical.

4. A cathode structure of a transition type plasma-arc torch as claimed in claim 1, wherein said axially symmetric, minute concave surface is circular-conical.

* * * * *